(12) United States Patent
Hosoda

(10) Patent No.: US 6,249,059 B1
(45) Date of Patent: Jun. 19, 2001

(54) WIND POWER DEVICE

(76) Inventor: Naoyoshi Hosoda, 61-8, Denen-Chofu 1-chome, Ota-ku, Tokyo (JP)

( * ) Notice: Subject to any disclaimer, the term of this patent is extended or adjusted under 35 U.S.C. 154(b) by 0 days.

(21) Appl. No.: 09/466,101

(22) Filed: Dec. 17, 1999

(30) Foreign Application Priority Data

Nov. 11, 1999 (JP) .................................................. 11-321281

(51) Int. Cl.[7] .................................................. F03D 9/00
(52) U.S. Cl. .................................................. 290/55; 290/44
(58) Field of Search .................................. 290/43, 44, 52, 290/55; 60/641.11, 641.12

(56) References Cited

U.S. PATENT DOCUMENTS

| | | | |
|---|---|---|---|
| 3,721,290 | * | 3/1973 | Butler, Jr. .............................. 165/85 |
| 3,936,652 | * | 2/1976 | Levine .................................... 290/2 |
| 4,031,173 | * | 6/1977 | Rogers ................................... 261/24 |
| 4,070,131 | * | 1/1978 | Yen ........................................ 415/3 |
| 4,452,046 | * | 6/1984 | Valentin ............................. 60/641.11 |
| 4,499,034 | * | 2/1985 | McAllister, Jr. ..................... 261/109 |
| 5,982,046 | * | 11/1999 | Minh ..................................... 290/55 |

* cited by examiner

*Primary Examiner*—Nicholas Ponomarenko
(74) *Attorney, Agent, or Firm*—Oppenheimer, Wolff & Donnelly

(57) ABSTRACT

A wind power device comprises a wind guide and a twisted member in the wind guide. The wind guide is rotatable around a vertical shaft so that a front opening of the wind guide may always face the wind. The wind which comes into the wind guide is guided around the twisted member and reaches to a blade wheel, which actuates a generator via gears to create electric power.

13 Claims, 4 Drawing Sheets

WIND POWER DEVICE

BACKGROUND OF THE INVENTION

The present invention relates to a wind power device disposed on the ground.

A conventional wind power system which has high efficiency and simple structure comprises two or three blade wheels which are rotatable around a horizontal axis and are pivotable around a vertical axis so that the blade wheel may always be perpendicular to the wind by suitable means.

The blade wheel is rotated by wind velocity at speed depending on diameter and shape of the blade and its pitch to drive a generator, so that wind power is converted into electric energy.

The blade wheel is rotated by low-density air flow. Even if diameter and area of the blade wheel are increased at maximum, about 45% of wind power energy which passes through the blade wheel is merely collected as useful energy actually.

SUMMARY OF THE INVENTION

It is an object of the present invention to provide a wind power device in which wind energy is effectively collected to achieve high efficiency power generation though a conventional blade wheel is employed in the device.

According to the present invention, there is provided a wind power device which comprises a wind guide which is gradually larger in diameter forwards, a twisted member which is twisted around a horizontal axis of the wind guide in the wind guide so that a twist angle may become larger rearwards, and a blade wheel disposed on the horizontal axis of the wind guide behind the twisted member in the wind guide to drive a generator.

The blade wheel can be rotated at high speed, thereby collecting wind power effectively and achieving high efficiency electric power generation.

BRIEF DESCRIPTION OF THE DRAWINGS

The features and advantages of the invention will become more apparent from the following description with respect to embodiments as shown in appended drawings wherein.

DETAILED DESCRIPTION OF PREFERRED EMBODIMENTS

Figure 1:
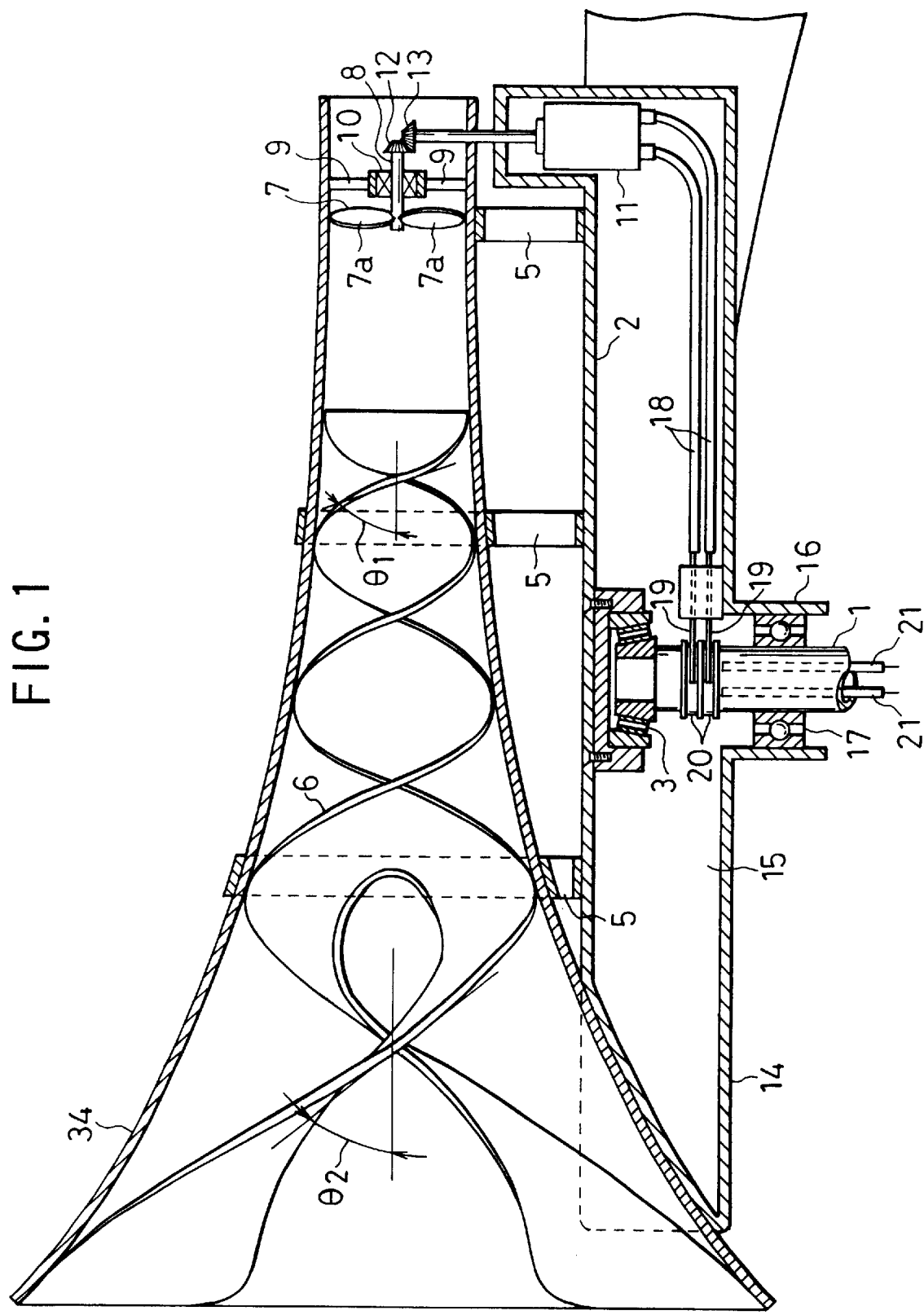
FIG. 1 is a vertical sectioned side view of the first embodiment of a wind power device according to the present invention.

FIG. 1 is the first embodiment of the present invention in which a twisted member 6 is fixed to the inner surface of a wind guide 4. In FIG. 1, the left side indicates a front portion.

At the upper end of a vertical tubular support shaft 1, a horizontal base plate 2 is pivotally supported in the middle around a support shaft 1 via a tapered-roller shaped thrust bearing 3. A forward enlarged wind guide 4 is horizontally mounted on the upper surface of the horizontal base plate 2 with support pieces 5. A spiral member 6 is inserted in the wind guide 4 so as to reduce a diameter rearwards and increase a twist angle rearwards. The outer circumferential surface of the spiral member 6 is fixed to the inner circumferential surface of the wind guide 4. A twist angle $\theta_1$ at the rear portion of the spiral member 6 is larger than a twist angle $\theta_2$ at the front portion. That is to say, a pitch of the spiral member 5 becomes smaller rearwards.

At the rear end of the wind guide 4, a blade wheel 7 in which the outer circumference is very close to the inner circumferential surface of the wind guide 4 is provided on a horizontal axis of the wind guide 4. The blade wheel 7 comprises two blades 7a,7a, and a shaft 12 for the blade wheel 7 is supported by a bearing 10 which is held by supports 9,9 at the rear end of the wind guide 4. The shaft 8 of the blade wheel 7 drives a generator 11 mounted to the horizontal base plate 2, via gears 12,13.

The base plate 2 and a bottom plate 14 define an inner space 15. Under the thrust bearing 3, a support tube 16 is projected from the bottom plate 14, and the support shaft 1 is supported by a radial ball bearing 17 in the support tube 16. The generator 11 is fixed in the inner space 15 below the blade wheel 7. Leads 18,18 extend from the generator 11 in the inner space 15, and brushes 19,19 at the end of the leads are elastically engaged with slip rings 20 on the outer circumferential surface of the support shaft 1. Each of the slip rings 20 is connected to a transmission line 21 in the support shaft 1.

The wind power device of the present invention is operated as below. The base plate 2 is rotatable around the support shaft 1, and a front opening of the wind guide 4 always faces the wind by wind pressure or suitable detecting control means. Air current which flows into the opening of the wind guide 4 is increased in speed and pressure to move rearwards, while it is twisted by the spiral member 6.

The twist angle $\theta_1$ at the rear portion of the spiral member 6 is larger than the twist angle $\theta_2$ at the front portion. Pressure receiving force by the air current becomes larger as it moves rearwards. Thus, if the twist angles of the spiral member 6 with respect to the axis of the wind guide 4 are suitably fixed, air current at the rear part is twisted more strongly than that at the front portion and increased in speed, and air pressure in the rear part becomes smaller. With decrease in air pressure at the rear portion of the spiral member 6, absorbing force at the front face of the wind guide 4 becomes larger, so that a lot of air over natural wind speed flows into the wind guide 4. The flowed air is twisted around the axis of the wind guide 4 and transferred rearwards, having increased speed at the circumference compared with that at the center.

The blade wheel 7 in the wind guide 4 is effectively driven by circumferential air current which is higher in speed than that at the center at the rear portion of the wind guide 4. However, speed of a central air current which has lower drive force to the blade wheel 7 remains relatively low. In air current, central velocity decreases by amount which corresponds to increase in circumferential velocity. High-speed air current is effectively applied to the circumference which has the highest pressure-receiving efficiency in the blade wheel 7. Air current velocity is relatively low at the center which has lower pressure-receiving efficiency and higher air resistance owing to the shaft 8 and the bearing 10. So total collection efficiency of wind energy by the blade wheel 7 becomes larger.

Figure 2:
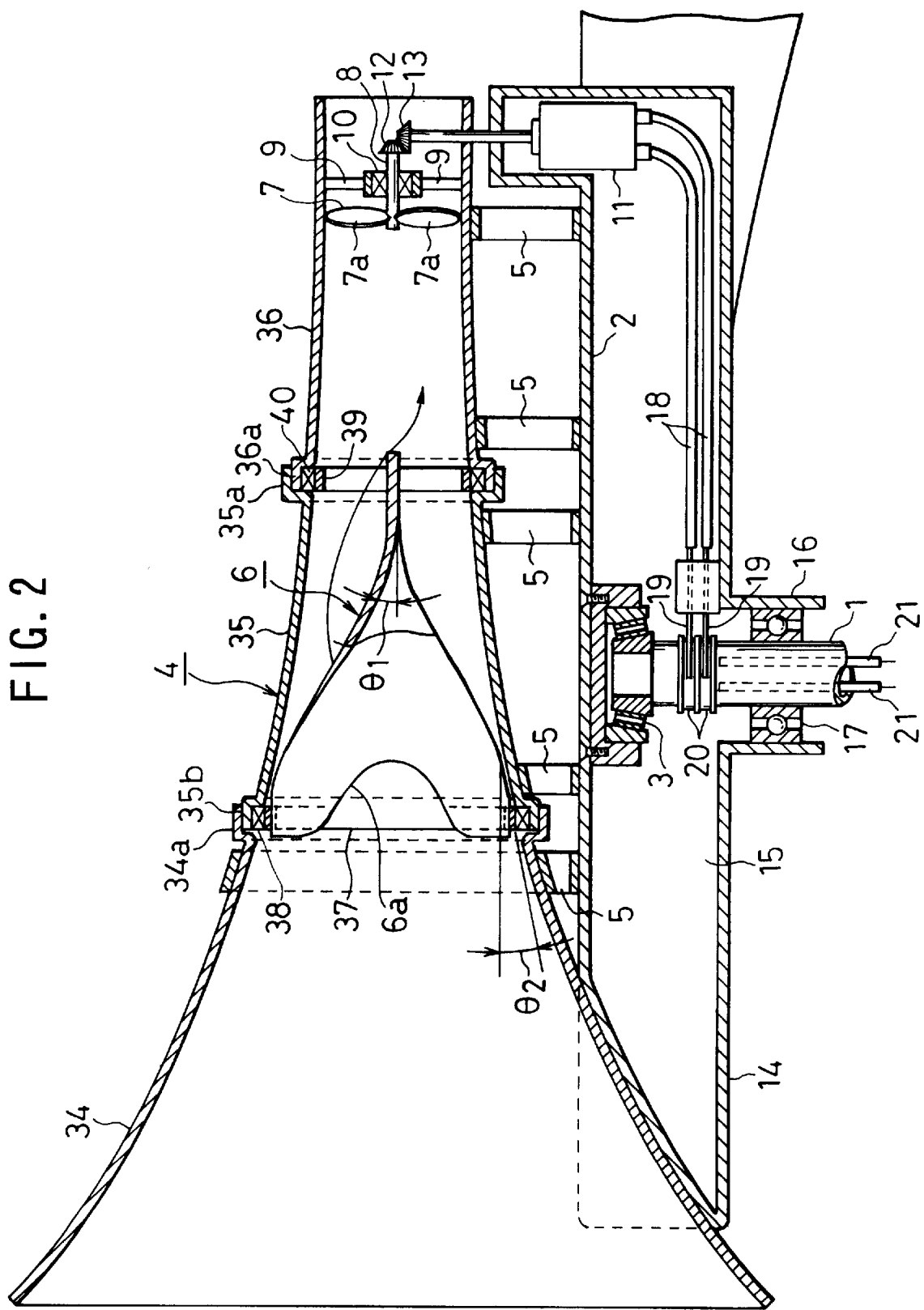
FIG. 2 is a vertical sectioned side view of the second embodiment of a wind power device according to the present invention.
Figure 3:
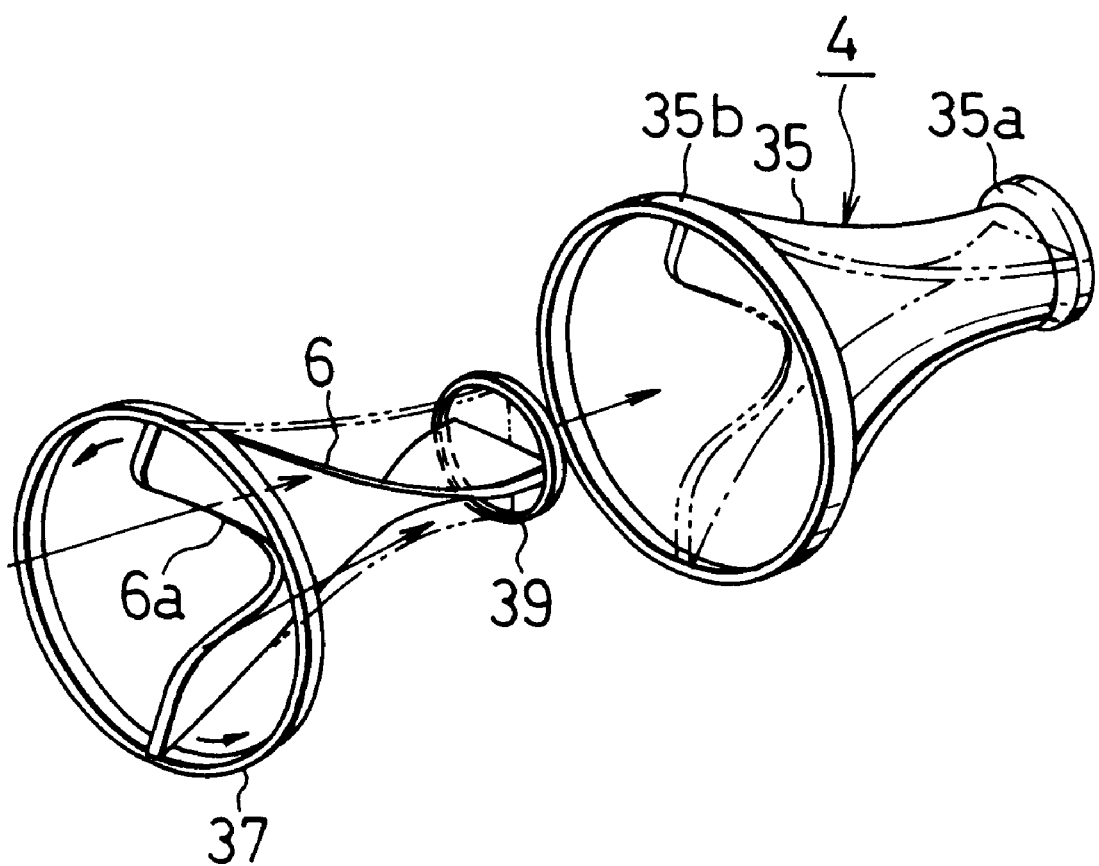
FIG. 3 is an exploded perspective view of a middle tube in FIG. 2.

FIGS. 2 and 3 illustrate the second embodiment of the present invention, in which a twisted member is rotatable around a horizontal axis in a wind guide.

The basic structure in FIG. 2 is almost the same as that in FIG. 1, and the same numerals are allotted to the same members, and detailed description therefor will be omitted. Detailed description will be given with respect to only what are different from those in FIG. 1. The left side in FIG. 2 indicates a front portion.

A wind guide 4 comprises a forward-enlarging diameter front tube 34, a slightly forward-enlarging middle tube 35 and a substantially cylindrical relatively small-diameter rear tube 36. Outward flanges 34a,35a are formed at the rear ends of the front and middle tubes 34 and 35 respectively, and outward flanges 35b,36a are formed at the front ends of the middle and rear tubes 35 and 36 respectively. The flange 35b of the middle tube 34a is engaged and fixed by welding in the flange 34a of the front tube 34, and the flange 36a of the rear tube 36 is engaged and fixed by welding in the flange 35a of the middle tube 35.

A front support ring 37 is supported with a thrust ball bearing 38 in the flange 35b at the front end of the middle tube 35 so that it may rotate easily. A rear support ring 39 is supported with a thrust ball bearing 40 in the flange 36a at the front end of the rear tube 36 so that it may rotate easily. In the rings 37,39, the front and rear ends of a twisted member 6 which is twisted around a horizontal axis of the wind guide 4 is fixed on the inner surfaces 37,39 of the support rings 37,39. A twisted angle $\theta_1$ at the rear end of the twisted member 6 is larger than a twisted angle $\theta_2$ at the front end, and its pitch becomes smaller rearwards.

The outer circumferential edge of the twisted member 6 is very close to the inner circumferential surface of the middle tube 35 between the support rings 37 and 39. A concave 6a for reducing rotation resistance is formed at the front end of the twisted member 6. At the rear portion of the rear tube 36, a blade wheel 7 is rotatably provided around a horizontal axis of the rear tube 36, and the outer circumferential edge of the blade wheel 7 is very close to the inner circumferential surface of the rear tube 36.

Its operation will be described as below.

A horizontal base plate 2 is rotated so that a front opening of the wind guide 4 may always face the wind by wind pressure or suitable detecting control means. Air current which flows into the front tube 34 is increased in velocity and pressurized to flow into the middle tube 35. So the twisted member 6 is strongly rotated around the horizontal axis with the support ring 37,39 in the middle tube 35.

Since the concave 6a for reducing rotation resistance is formed at the front edge of the twisted member 6, the twisted member 6 is easily rotated without resistance by air current or rotation. Since the twist angle $\theta_1$ at the rear portion of the twisted member 6 is larger than the twist angle $\theta_2$ at the front end, a lot of air over natural wind velocity flows into the wind guide 4 and is twisted around the horizontal axis by the twisted member 6 with higher velocity in the circumference than that in the center. At the rear portion of the wind guide 4, the blade wheel 7 is effectively driven by air current in which velocity in the circumference is larger than that in the center. A lot of air over wind velocity flows into the middle tube 35. The flowed air is twisted around the horizontal axis with small resistance, and is flowed into the rear tube 36 with velocity in the circumference higher than that in the center.

The blade wheel 7 in the rear tube 36 is effectively driven by air current which is flowed into the rear tube 36 with increased circumferential velocity, while air current velocity in the center is still low to provide drive effect.

Therefore, air current velocity in the center with lower pressure-receiving efficiency and higher air resistance is relatively low, and collection efficiency of wind energy by the blade wheel 7 becomes larger.

FIG. 5 illustrates the third embodiment of the present invention in which a wind guide is partially rotatable around a horizontal axis, and a twisted member fixed in part of the wind guide is rotatable around the horizontal axis with the part of the wind guide.

In the embodiment, the middle tube 35 is rotatable with respect to the front tube 34 and the rear tube 36 in FIG. 2, and the twisted member 6 is inserted in the middle tube 35 and fixed therewith.

Figure 4:
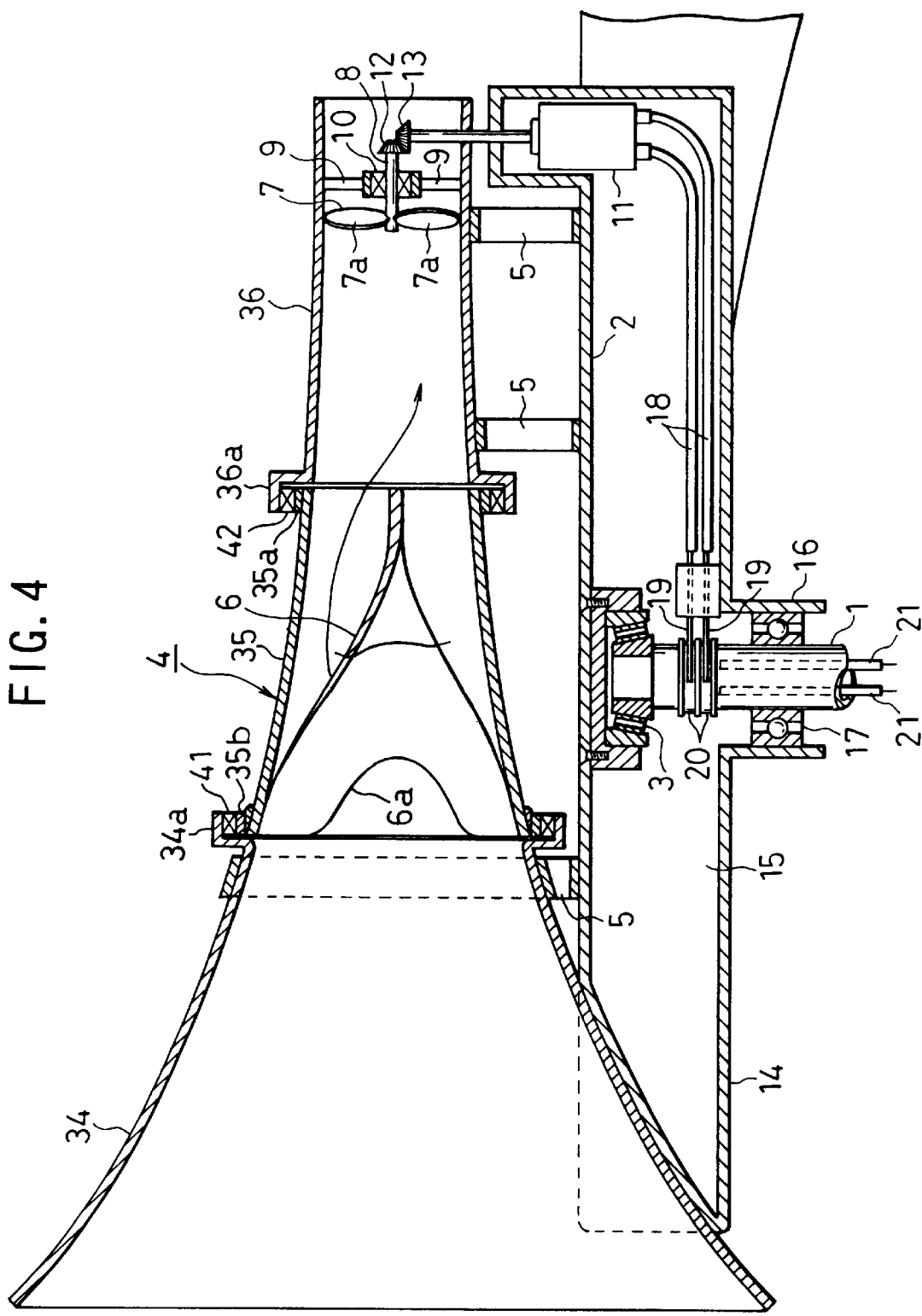
FIG. 4 is a vertical sectioned side view of the third embodiment of a wind power device according to the present invention.

In FIG. 4, the outer circumferential edge of the twisted member 6 is fixed to the inner surface of the middle tube 35 with welding. Outward flanges 35b,35a at the front and rear ends of the middle tube 35 are rotatably supported in outward flanges 34a,36a at the rear end of the front tube 34 and at the front end of the rear tube 36 via thrust bearings 41,42 respectively. The inner surface of the middle tube 35 is continuously connected with the inner surfaces of the front tube 34 and the rear tube 36. Others are the same as those in FIG. 2, and will not be described in detail. In FIG. 4, a twisted member 6 is rotated together with the middle tube 35 by air current, and velocity of air current which is flowed into a rear tube 34 becomes larger in the circumference. Similar advantage to the device in FIG. 3 can be achieved.

The foregoing merely relate to embodiments of the present invention. Various changes and modifications may be made by person skilled in the art without departing from the scope of claims wherein:

What is claimed is:

1. A wind power device which comprises:
   a wind guide which is gradually larger in diameter forwards;
   a twisted member which is twisted around a horizontal axis of the wind guide in the wind guide so that a twist angle may become larger rearwards; and
   a blade wheel disposed on the horizontal axis of the wind guide behind the twisted member in the wind guide to drive a generator.

2. A wind power device as claimed in claim 1 wherein the twisted member is fixed in the wind guide.

3. A wind power device as claimed in claim 1 wherein the blade wheel is connected to the generator via a gear to create electric power.

4. A wind power device as claimed in claim 1 wherein the wind guide is rotatable around a vertical shaft so that an enlarged opening of the wind guide may always face a wind.

5. A wind power device as claimed in claim 1 wherein the twisted member comprises a spiral member, an outer circumferential surface of which is fixed to an inner circumferential surface of the wind guide.

6. A wind power device as claimed in claim 1 wherein the wind guide comprises front, middle and rear tubes.

7. A wind power device as claimed in claim 6 wherein the middle tube has support rings at front and rear ends, the twisted member being fixed to the support rings in the middle tube.

8. A wind power device as claimed in claim 7 wherein the twisted member supported by the support rings is rotatable in the middle tube around the horizontal axis of the wind guide.

9. A wind power device as claimed in claim 8 wherein a thrust ball bearing is provided between each of the support rings and the middle tube so that the support rings may be rotated together with the twisted member in the middle tube.

10. A wind power device as claimed in claim 9 wherein an outward flange at a rear end of the front tube is engaged on an outward flange at a rear end of the middle tube which is engaged with the support ring via the thrust ball bearing, an outward flange at a rear end of the middle tube being engaged on an outward flange at a front end of the rear tube which is engaged with the middle tube via the thrust ball bearing.

11. A wind power device as claimed in claim 6 wherein a thrust ball bearing is provided between the middle tube and adjacent front and rear tube so that the middle tube may be rotated together with the twisted member with respect to the front and rear tubes.

12. A wind power device as claimed in claim 11 wherein an outward flange at a rear end of the front tube is engaged with an outward flange at a front end of the middle tube via the thrust ball bearing, an outward flange at a front end of the rear tube being engaged with an outward flange at a rear end of the middle tube via the thrust ball bearing.

13. A wind power device as claimed in claim 6 wherein a concave is formed at a front of the twisted member to reduce air resistance.

* * * * *